Aug. 12, 1958 — K. C. GAYNOR — 2,846,954
ARTICULATED CAR
Filed Dec. 14, 1955 — 2 Sheets-Sheet 1
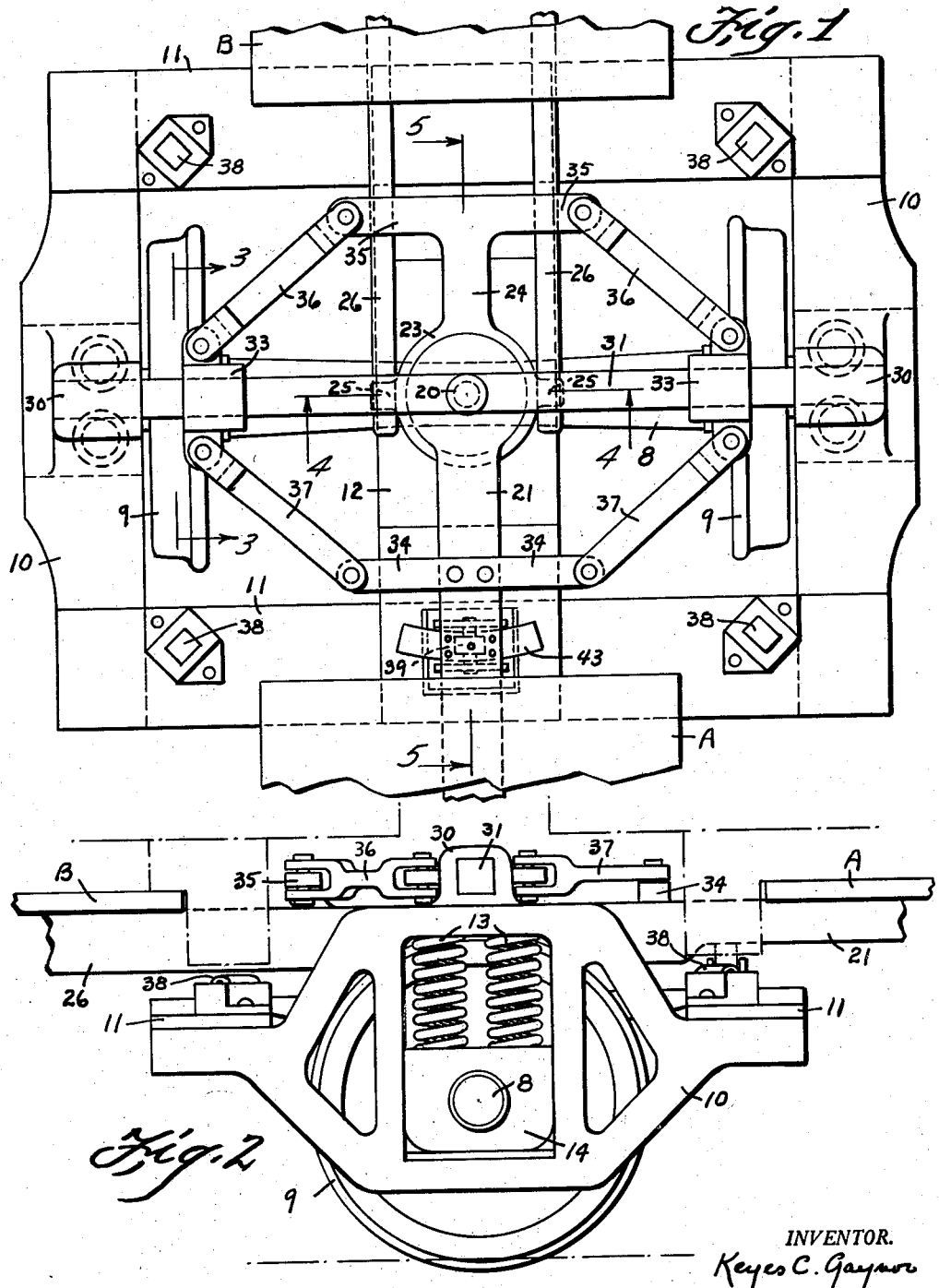
INVENTOR.
Keyes C. Gaynor
BY Louis O. French
Att'y Aug. 12, 1958
K. C. GAYNOR
2,846,954
ARTICULATED CAR
Filed Dec. 14, 1955
2 Sheets-Sheet 2
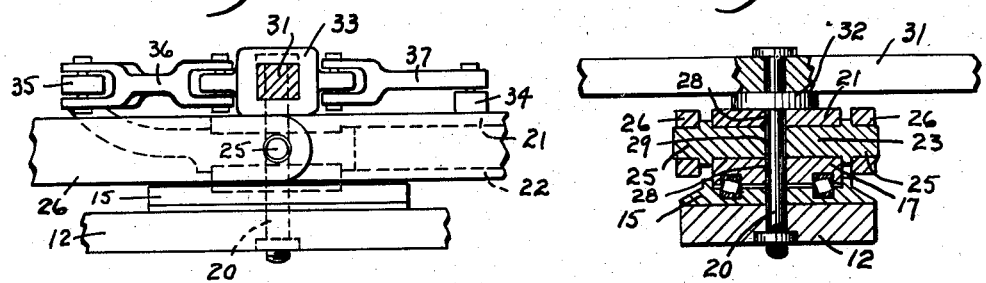
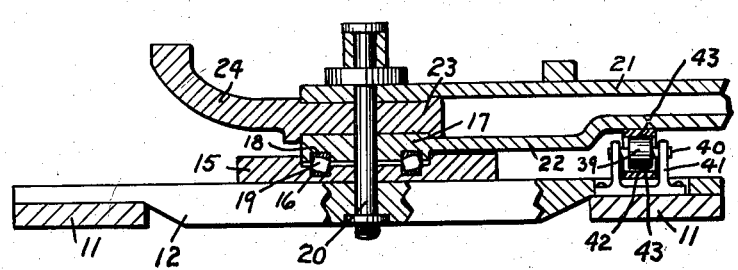
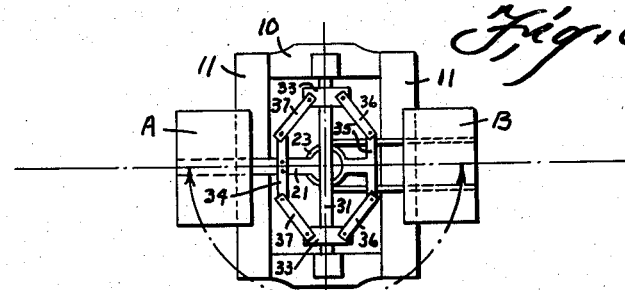
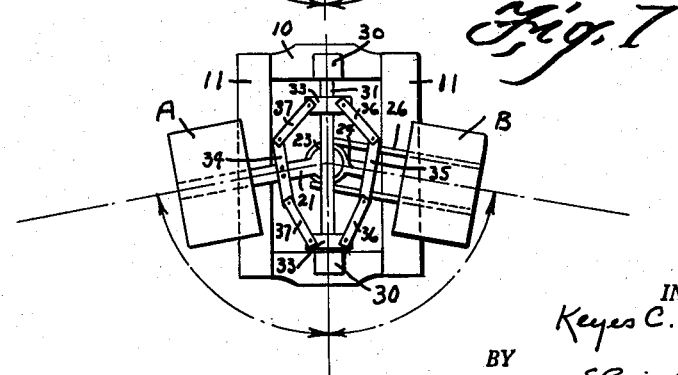
INVENTOR.
Keyes C. Gaynor
BY Louis O. French
Atty.

United States Patent Office 2,846,954
Patented Aug. 12, 1958

2,846,954

ARTICULATED CAR

Keyes C. Gaynor, Sioux City, Iowa

Application December 14, 1955, Serial No. 553,099

3 Claims. (Cl. 105—4)

The invention relates to articulated cars.

The main object of the invention is to provide articulated cars having an articulated joint structure between them that is carried by a single axle wheeled truck. More particularly, the object of the invention is to provide a universal joint connection between the cars and the truck with a linkage system between the cars and the truck whereby the single axle of the truck will be angularly shifted when the cars are negotiating a curve.

A further object of the invention is to provide an improved bearing for the center plate of a railcar truck including barrel type roller bearings. A plain flat bearing is now used for the center plate of all rail cars, and it is only oiled infrequently. It is believed that many of the sideway jerks in cars traveling at high speed and sometimes causing derailment are caused by the large static or starting frictions set up in this bearing which to a large extent are eliminated by the improved bearing hereinafter described.

The invention further consists in the several features hereinafter described and more particularly defined by claims at the conclusion hereof.

In the drawings:

Fig. 1 is a plan view of an articulated truck structure embodying the invention, parts being broken away;

Fig. 2 is a side elevation view of parts shown in Fig. 1;

Fig. 3 is a detailed vertical sectional view taken on the line 3—3 of Fig. 1;

Fig. 4 is a detailed vertical sectional view taken on the line 4—4 of Fig. 1;

Fig. 5 is a detailed vertical sectional view taken on the line 5—5 of Fig. 1;

Figs. 6 and 7 are diagrammatic views showing the operation of the structure.

Referring to the drawings, the numeral 8 designates the axle carrying rail engaging wheels 9 and journalled in the side frame members 10 of the truck frame which includes the cross bolsters 11 and a center bolster 12.

The car bodies A and B are operatively connected to the truck frame as hereinafter described, which frame is yieldingly supported from the axle 8 by sets of springs 13 interposed between the top of each side frame member 10 and the vertically slidable bearing box 14 for the axle 8.

Referring to Figs. 1 to 5, the center bolster 12 has a truck bearing plate 15 provided with a bearing raceway 16 and cooperating with a car bearing plate 17 provided with a companion raceway 18 to from a mounting for a series of radially disposed barrel type roller bearings 19 working in said raceways 16 and 18. A center or king pin 20 mounted in the bolster 12 extends upwardly through the centers of bearing plates 15 and 17.

Car body A has top center sill part 21 and a bottom center sill part 22 that forms a part of the bearing plate 17. Between the sill parts 21 and 22 a center bearing plate 23 is mounted. The plate 23 has an upwardly extending arm or lever 24 and also has diametrically disposed pin extensions 25 extending at right angles from the arm 24.

Car body B has a center sill yoke whose arms 26 are pivotally mounted on the pin extensions 25 of the plate 23.

The king pin 20 extends upwardly through center holes 28 in the sill parts 21 and 22 and a center hole 29 in the plate 23 so that both car bodies are free to swing laterally or swivel relative to the center bolster 12 and also through the universal joint construction provided by the intermediate member or bearing plate 23 the car bodies can swing vertically relative to each other. Fixedly mounted in bosses 30 on the side members 10 is a truck guide bar 31. The upper end of the king pin 20 may pass through the central portion of this bar and through a spacer washer 32 on the top of the sill part 21.

Blocks or collars 33 are mounted to slide freely along the bar 31 toward and away from its points of connection with the side members 10. The center sill part 21 of car body A has a bar providing laterally extending arms 34. The arm or lever 24 of the center bearing plate 23 has lateral extensions 35. One side of each collar 33 is operatively connected to the lateral extensions 35 in each instance by a link 36. The other side of each collar 33 is operatively connected to the arms 34 in each instance by a link 37. With this arrangement angular movement of each car body as the car is negotiating a curve will through links secured to that body exert a pull through one or the other of the collars 33 upon the bar 31, which through its connection with the side members 10 will shift the truck frame and consequently the axle 8 in the same angular direction as that in which the car is swinging but through half the angle of the swing and thereby angularly shift the axle about the center of the king pin 20 as a center to permit the wheels 9 to follow the curved track.

The action of the linkage connection above described is illustrated in Figs. 6 and 7. When the car is proceeding on a straight track, as shown in Fig. 6, the truck frame through the bar 21, collars 33, and sets of links 36 and 37 under the restraint of the car bodies A and B will be maintained in a position in which the axle 8 is at substantially right angles to the rails. When the car is running on a curved portion of the track, the links 37 on the inner side of the curve will through the car bodies and their connections with these links exert a pushing force on the block 33 to which they are connected while the links 36 on the outer side of the curve will through the car bodies and their connections with these links exert a pulling force on the other block 33, and these forces acting through said blocks and the bar 31 cause the truck frame and its axle to be angularly shifted so that the axle assumes a substantially true radial position relative to the curvature of the track over which the car is traveling.

The usual side swing limit stop rollers 38 have been indicated at the corner portions of the truck frame for engagement with the usual abutments on the car bodies, and a stabilizer has been provided to keep the truck frame parallel with the truck floor of the car body A having the sills 21 and 22. As herein shown, the stabilizer includes a roller 39 mounted on a pin 40 carried by a bracket 41 secured to one of the cross bolsters 11 and working in a housing 42 secured to the underside of the sill 22 and providing spaced surfaces 43 upon either one of which the roller 39 can ride while the car is operating.

The barrel type roller bearings 19 provide a bearing between the plate 15 that takes the load of the car bodies and the plate 17 that bears on the truck frame which will insure the center bearing parts turning freely or without undue friction at all times so that sidewise jerks of the cars occasioned by the sticking or frictional forces set up in the usual flat plate bearings is avoided.

I desire it to be understood that this invention is not to be limited to any particular form or arrangement of parts except in so far as such limitations are specifically included in the appended claims.

What I claim as my invention is:

1. In an articulated car, the combination of a pair of car bodies having a universal joint connection with each other including a swivelling member having a vertically swingable connection with one of said car bodies and a planar connection with the other of said car bodies, a truck carrying said universal joint connection and free to turn relative thereto, said truck having a wheeled single axle, push-pull linkage between opposite sides of said swivelling member and the corresponding opposite ends of said truck, and push-pull linkage connections between opposite sides of the other car body and opposite ends of said truck, each of said linkage connections having sliding anchorage mountings on said truck whereby horizontal and vertical angular movements of said truck and car bodies relative to each other when the car bodies are moving over a curved track of varying vertical curvature is permitted.

2. In an articulated car, the combination of a pair of car bodies having a universal joint connection with each other including a swivelling member having a vertically swingable connection with one of said car bodies, a truck carrying said universal joint connection having a center plate having a roller bearing mounting for said last named connection, said truck having a wheeled single axle, push-pull linkage connections between opposite sides of said swivelling member and corresponding opposite ends of said truck, and push-pull linkage connections between opposite sides of the other car body and corresponding opposite ends of said truck, said linkage connections having sliding anchorage mountings on said truck whereby horizontal and vertical angular movements of said truck and car bodies relative to each other when the car is moving over a curved track of varying curvature are permitted.

3. In an articulated car, the combination of a pair of car bodies having a universal joint connection with each other including a swivelling member, a truck having a center plate on which said connection is mounted to swivel, said truck having a center bolster carrying said center plate, means radially spaced from said center plate and operatively connecting one of said car bodies to the truck to limit side swing of this body relative to the truck, said truck having a wheeled axle, and means connecting opposite ends of said truck to said swivelling member and to the other of said car bodies to cause vertical and horizonal angular movements of said truck and car bodies relative to each other when the cars are moving on curved track of varying vertical curvature.

References Cited in the file of this patent

UNITED STATES PATENTS

| 46,784 | Driggs | Mar. 14, 1865 |
| 267,335 | Driggs | Nov. 14, 1882 |
| 1,408,167 | Brilhart | Feb. 28, 1922 |

FOREIGN PATENTS

| 552,538 | Germany | June 15, 1932 |